US012542404B2

(12) United States Patent
Jensen

(10) Patent No.: US 12,542,404 B2
(45) Date of Patent: Feb. 3, 2026

(54) SUPPORT LIGHTING FOR ELECTRICAL POWER SYSTEMS

(71) Applicant: Darrin Jensen, Dodge Center, MN (US)

(72) Inventor: Darrin Jensen, Dodge Center, MN (US)

(73) Assignee: DPJ LLC, Dodge Center, MN (US)

(*) Notice: Subject to any disclaimer, the term of this patent is extended or adjusted under 35 U.S.C. 154(b) by 371 days.

(21) Appl. No.: 18/103,903

(22) Filed: Jan. 31, 2023

(65) Prior Publication Data

US 2023/0187883 A1 Jun. 15, 2023

Related U.S. Application Data

(63) Continuation-in-part of application No. 15/676,490, filed on Aug. 14, 2017, now abandoned.

(51) Int. Cl.

| | |
|---|---|
| ***H01R 13/717*** | (2006.01) |
| ***F21S 9/02*** | (2006.01) |
| ***F21V 5/00*** | (2018.01) |
| ***F21V 23/04*** | (2006.01) |
| ***H01B 7/40*** | (2006.01) |
| ***H01R 13/66*** | (2006.01) |
| ***H01R 13/70*** | (2006.01) |
| ***H01R 24/22*** | (2011.01) |
| ***H01R 24/30*** | (2011.01) |
| ***H01R 103/00*** | (2006.01) |

(52) U.S. Cl.

CPC ............ *H01R 13/7175* (2013.01); *F21S 9/02* (2013.01); *F21V 5/006* (2013.01); *F21V 23/04* (2013.01); *H01B 7/40* (2013.01); *H01R 13/6675* (2013.01); *H01R 13/70* (2013.01); *H01R 13/7177* (2013.01); *H01R 24/22* (2013.01); *H01R 24/30* (2013.01); *H01R 2103/00* (2013.01)

(58) Field of Classification Search

CPC ................ H01R 13/6675; H01R 13/70; H01R 13/7175; H01R 13/7177; H01R 24/22; H01R 24/30; F21V 23/04; F21V 5/006; F21S 9/02; H01B 7/40

USPC .......................................................... 362/391

See application file for complete search history.

(56) References Cited

U.S. PATENT DOCUMENTS

| | | | | |
|---|---|---|---|---|
| 1,955,418 A | | 4/1934 | Nels | |
| 3,382,255 A | | 5/1968 | Winslow | |
| 3,924,914 A | | 12/1975 | Banner | |
| 3,942,859 A | | 3/1976 | Korodi | |
| 5,007,857 A | | 4/1991 | Wright | |
| 5,207,594 A | * | 5/1993 | Olson | H01R 13/652 439/910 |
| 5,320,560 A | | 6/1994 | Fladung | |
| 5,528,477 A | | 6/1996 | Carmo | |
| 6,290,533 B1 | | 9/2001 | Major | |

(Continued)

*Primary Examiner* — Thomas M Sember

(74) *Attorney, Agent, or Firm* — Craig J. Lervick; Larkin Hoffman Daly & Lindgren, Ltd.

(57) ABSTRACT

A lighting system is incorporated into the ends of the electrical power cords to provide light when working in dark environments. The lighting source is preferably battery-operated, thus allowing the user to find power receptacles when in these dark environments. Additionally, a second power source is included in the plug receptacle end, which can be battery-powered or can be powered by electrical power carried within the power lines. The ends of the extension cord include supports.

18 Claims, 12 Drawing Sheets

(56) References Cited

U.S. PATENT DOCUMENTS

| | | | | |
|---|---|---|---|---|
| 7,004,595 | B1 | 2/2006 | Stoddard | |
| 8,105,106 | B1 | 1/2012 | Stoddard | |
| 9,431,779 | B1 | 8/2016 | Abbisso | |
| 9,746,143 | B2 | 8/2017 | Osburn | |
| 10,535,961 | B2 | 1/2020 | Cote | |
| 2003/0194906 | A1 | 10/2003 | Arkin | |
| 2005/0124209 | A1 | 6/2005 | Currie et al. | |
| 2005/0135103 | A1 | 6/2005 | Evans | |
| 2005/0265035 | A1 | 12/2005 | Brass | |
| 2006/0034091 | A1 | 2/2006 | Kovacik | |
| 2006/0039136 | A1 | 2/2006 | Probasco et al. | |
| 2008/0102689 | A1 | 5/2008 | Dhir | |
| 2008/0212319 | A1 | 9/2008 | Klipstein | |
| 2009/0097250 | A1 | 4/2009 | Leasure | |
| 2010/0118554 | A1* | 5/2010 | Kraus, Jr. | H02G 3/24<br>362/396 |
| 2010/0317222 | A1 | 12/2010 | Tom | |
| 2014/0106611 | A1 | 4/2014 | Hardy | |

* cited by examiner

SUPPORT LIGHTING FOR ELECTRICAL POWER SYSTEMS

BACKGROUND

When working at night, or in dark spaces, it is often difficult to locate items or necessary resources. In one particular example, when working in a location with very limited lighting, whether a darkened room or an outdoor location at night, it is typically very difficult to find electrical receptacles when needed. This is especially troublesome when attempting to find need power, which then can be used for lighting and/or necessary tools. In most cases, these situations require the use of a flashlight or some external lighting source. That said, this is often inconvenient since the flashlight may not be nearby or conveniently located. Additionally, this requires the handling of the flashlight, in addition to a cord and other tools that are being carried.

In these cases, it would be particularly beneficial if lighting components were convenient and available when handing the electrical power cords themselves, so that outlets and power sources could be easily located. Clearly, electrical lighting systems do not solve this problem, since the user is searching for a power source in the first place. Obviously, once power is located and sufficiently supplied, electrical spotlights, work lights, etc. can then be utilized. That said, this often requires use of additional components. More specifically, a work light or spotlight must be located and attached to a receptacle end of the cord. An integrated system would be beneficial, thus avoiding the need for additional components.

In addition, sometimes one has to work in tight spaces that are difficult to light. These spaces are difficult to light with a drop light or the like. In these instances, it would be advantageous to have an instrument that can fit into the space and direct light to the space. In such cases, a light bulb or other light source sending light in all directions around the bulb would be too big to fit into the tight space. In addition, even if it would fit into the space such a bulb would direct light back at the user which again makes it difficult to see past the light to the space. A drop light might shield some of the light but will generally still be bigger than a bare bulb. In other words, a bulb or drop light will effectively blind the user and will also occupy too much of the tight space.

SUMMARY

In order to provide a useful tool for locating electrical power sources, a battery-operated lighting source is incorporated into the plug portion of the electrical cord. The battery-operated lighting system is relatively small and self-contained within the plug housing, thus avoiding obstructions with other components and/or other plugs. Further, the battery-operated lighting system is easily operable using a control button located on an outer surface of the plug housing. To provide further utility, this battery operated lighting system is incorporated at the plug-in end of an extension cord, which can then supply power to remote locations. In the extension cord embodiment, the receptacle end may also include a lighting system for use in further illuminating various locations. This lighting system in the receptacle end could be battery operated, or alternatively powered by the electrical power carried within the cord. Again, this receptacle end power lighting system would be easily operated using control buttons located on an outer surface of the receptacle housing.

In addition to the battery operated light being incorporated into one end, the utility of the lighting system is further enhanced by having lighting systems at both ends of an electrical cord. In those situations where an outlet has been located and power is being provided to the cord, additional lighting needs often exist. To address this need, a small light is incorporated into the receptacle end of the cord for use in further locating items. Once power is supplied to the cord, this power is used to supply a switchable light source. To allow easy identification, in one embodiment, the switch is illuminated (i.e. a switch button at the receptacle end is illuminated) and a receptacle end light source can be operated to locate items and/or become familiar with the surrounding. Of course the switch does not have to be illuminated and will still be withing the scope of the invention. This provides an immediate tool for the user, without the need for additional components.

BRIEF DESCRIPTION OF THE DRAWINGS

Further objects and advantages of the present invention can be seen from reading the following detailed description, in conjunction with the drawings in which.

DESCRIPTION

The disclosed lighting system can be incorporated in multiple electrical systems and/or electrical devices. In one particular embodiment, the incorporation of lighting features into an extension cord is outlined and discussed below. Those skilled in the art will recognize that the same features and advantages can be implemented in multiple devices. The following description is intended to describe the features and advantages of the present invention, and is not intended to be limiting in any way.

Figure 1:
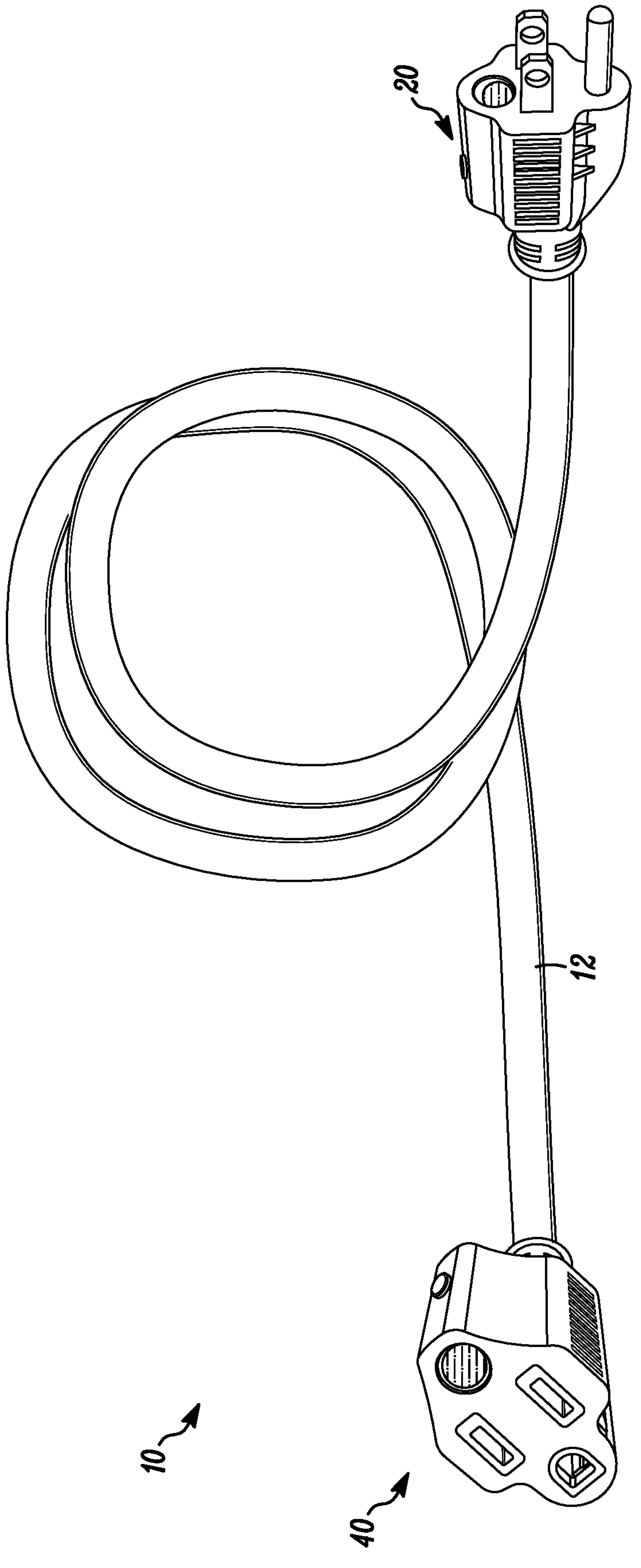
FIG. 1 is a perspective view of the lighting system as embodied in an extension cord.
Figure 2:
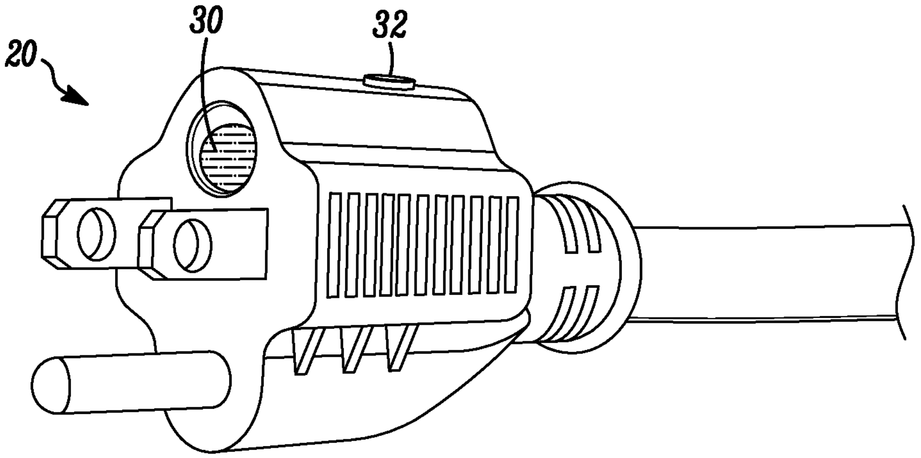
FIG. 2 is a close-up view of the plug-in end of an electrical power cord.
Figure 3:
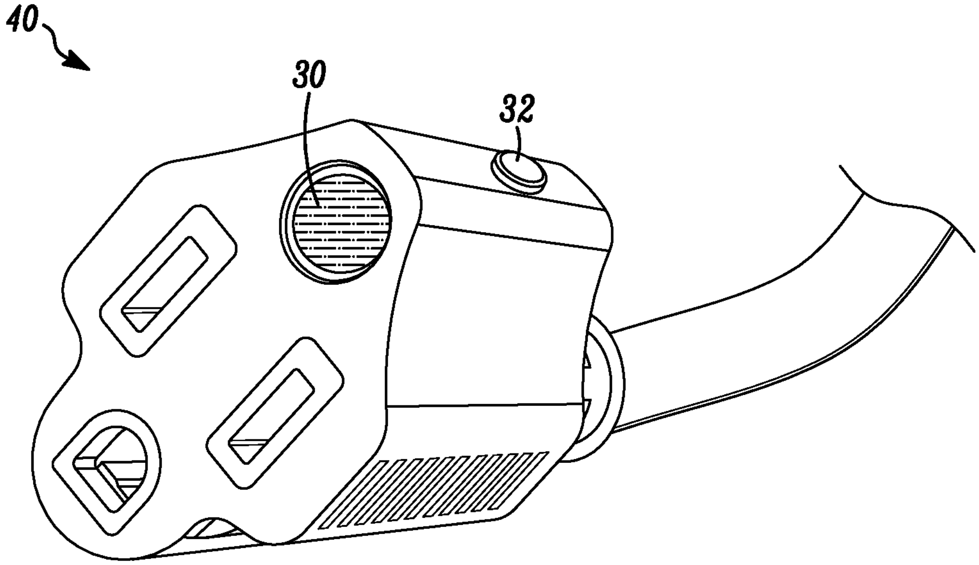
FIG. 3 is a close-up view of the receptacle end of an electrical power cord.

Referring now to FIG. 1, an embodiment of an extension cord 10 is illustrated. As will be recognized, extension cord 10 includes a plug-in end 20, a receptacle end 40 and an electrical cord 12. Plug-in end 20 and receptacle end 40 are both physically and electrically connected to one another via cord 12. Similarly, FIG. 2 shows a close-up view of plug-in end 20 while FIG. 3 illustrates a close-up view of receptacle end 40. As is well recognized, the extension cord is used in many different situations/settings. Some of these situations include use of the extension cord in rugged, dirty, and/or rough settings. As such, it is essential that the extension cord be rugged and capable of withstanding tough conditions. This includes significant levels of insulation and protection for the electrical element itself. It is contemplated that the structures outlined below would also have these characteristics and be capable of operating in these tough environments.

As part of the operating environments generally mentioned above, it should be recognized that the extension cords will be dragged, dropped and/or pulled across many different surfaces. Additionally, the size of plug-in end 20 and receptacle end 40 are important. It may be necessary to pull the extension cord through an opening, or place in a tight area. Thus, the plug-in end 20 and receptacle end 40 should be kept as small as possible. As shown in FIGS. 2 and 3, the lighting structure positioned within a ridge on an upper side of the housings (22 and 42, discussed in further detail below) does not significantly increase the size of these structures.

Figure 4A:
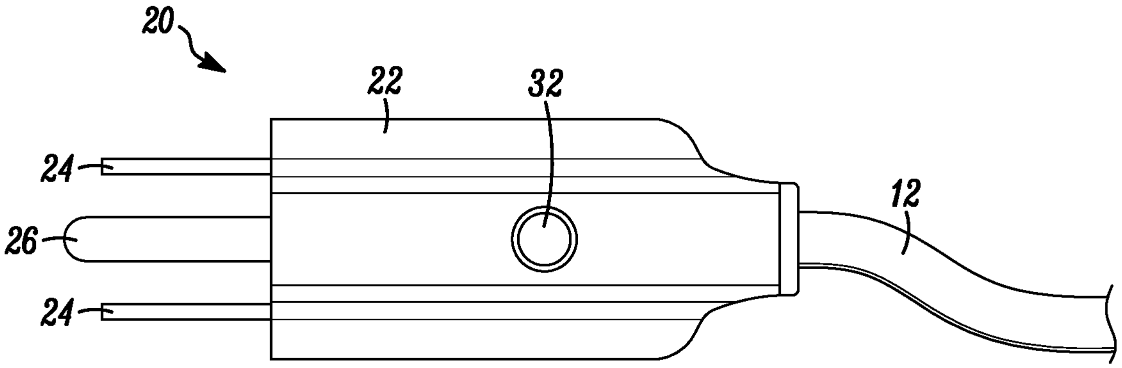
FIGS. 4A and 4B are a top view and an end view, respectively, of the plug-in end.
Figure 4B:
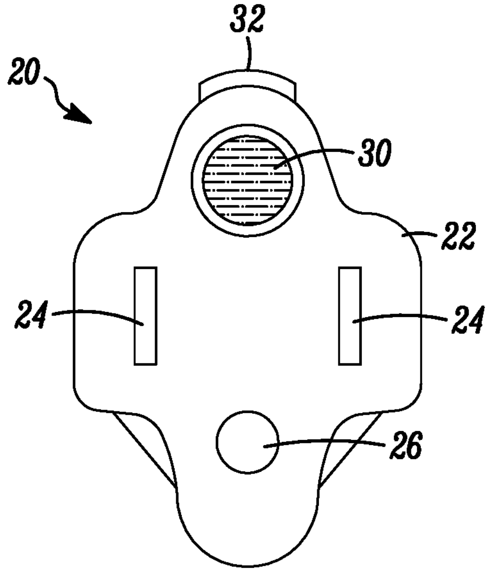

Referring now more specifically to FIGS. 4A and 4B, the plug-in end 20 is illustrated in further detail. More specifically, FIG. 4A shows a top view of plug-in end 20 while FIG. 4B shows a front view thereof. As seen, plug-in end 20 includes a housing 22 with electrical prongs 24 and a ground prong 26 extending from one end thereof. As will be recognized, this is the three-prong electrical plug commonly used and seen in the United States of America. Those skilled in the art will recognize that the configuration of plugs can vary, depending upon the specific need and international requirement involved. As also illustrated, a lighting system switch 32 is located on an upper side of housing 22. Further, a lightbulb 30 is positioned within housing 22, and is aimed or directed generally in the same direction as prongs 24 and 26. As will be further discussed below in relation to FIG. 5, lightbulb or other light source 30 is part of a battery-operated lighting system contained within housing 22, and which is operable using button 32. It is contemplated that button 32 will be a press-and-hold button, so that the light is "on" only when the button is being held down. This helps to preserve battery power, and is most practical since lighting from this end of the cord is often needed for only a short period of time. That said, alternatives are possible, including a "click-on/click-off" type button. It should be noted that the term lightbulb as used above can include any source of light such as an LED, incandescent bulb and the like.

Figure 4C:
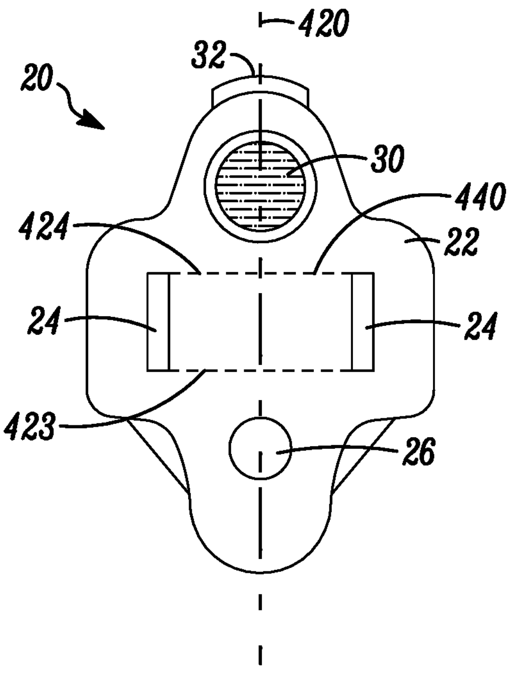
FIG. 4C is an end view of the plug-in end with reference lines shown in phantom.

FIG. 4C is an end view of the plug-in end with reference lines shown in phantom. The reference lines are shown in phantom since these lines are not really visible on the plug-in end. The reference lines are shown so that the position of the lightbulb can be can be set on one side of a box or rectangle 440 having reference line 424, reference line 423, and the blade prongs 24 defining the box or rectangle 440. As shown in FIGS. 4A, 4B, and 4C, the prong 26 is on one side of the box or rectangle 440 and the light 30 is on the other side of the box or rectangle 440. In this embodiment, the light 30 and the prong 26 are along line 420 which could also be considered a centerline along the face of the plug-in end 20. It should be noted that some plug-in end have one blade prong 24 that is longer than the other. In this case the box defined would still be a four-sided polygon with at least two unequal sides represented by the differently sized blade prongs 24. The light 30 would still be on one side of the four-sided polygon 440 and the prong 26 would be on the other side of the four-sided polygon 440.

Figure 5:
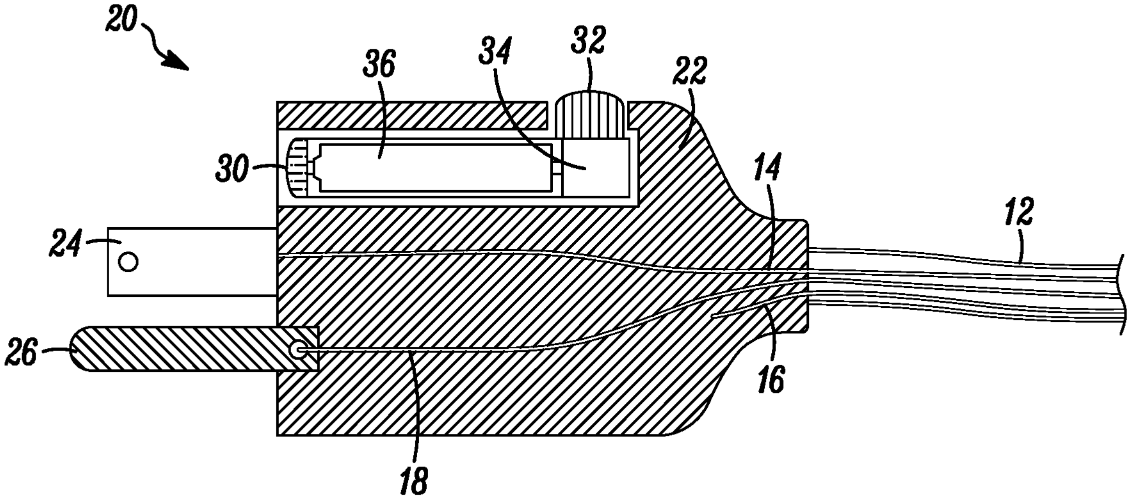
FIG. 5 is a partial cross-sectional schematic view of the plug-in end of an electrical power cord.

To further illustrate the internal workings of plug-in end 20, FIG. 5 illustrates a schematic cross-sectional view of this component. As previously mentioned, housing 22 contains lightbulb 30, and accommodates switch 32. Housing 22 will also include appropriate electrical connections or wires 14, 16, 18, to provide electrical power down cord 12. As recognized, these electrical connections are coupled to prongs 24 and ground prong 26. Also illustrated in FIG. 5 is switch 32, which is coupled to an electrical switching mechanism 34, and which will provide controlled connections so that power to and from a battery 36 is provided to lightbulb 30. While multiple switching mechanisms are possible, this approach provides a relatively straightforward connection which is also unobtrusive and convenient for a user.

In one embodiment, battery operated lighting system illustrated in FIG. 5 is a self-contained light unit, such as a flashlight. More specifically, lightbulb 30, switch 32, and battery 36 are all contained within a separate housing such as a cylindrical tube. In practice, this separate housing is self-contained and sized to be easily molded into an upper portion of housing 22. To be effective the self-contained housing of the light system must be sized efficiently to be contained within housing 22 so that the plug housing 22 does not become unreasonably large.

As will be recognized, the plug-in end 20 illustrated in FIGS. 4 and 5 will easily allow a battery-operated light to be controlled by a user. Again, this could be incorporated into an extension cord as outlined above, or could be included in any cord, such as an appliance cord. This additional utility will allow any user to locate electrical receptacles when operating in dark environments or circumstances.

It will be appreciated that the battery 36 outlined above could be a standard battery, or could easily be rechargeable. Since line power will be present at certain times, there are certain advantages provided by a rechargeable battery. Further, the system could be configured so that the battery 36 is being recharged any time the cord is connected to electrical power. In this way, battery life becomes a very insignificant issue.

Figure 6A:
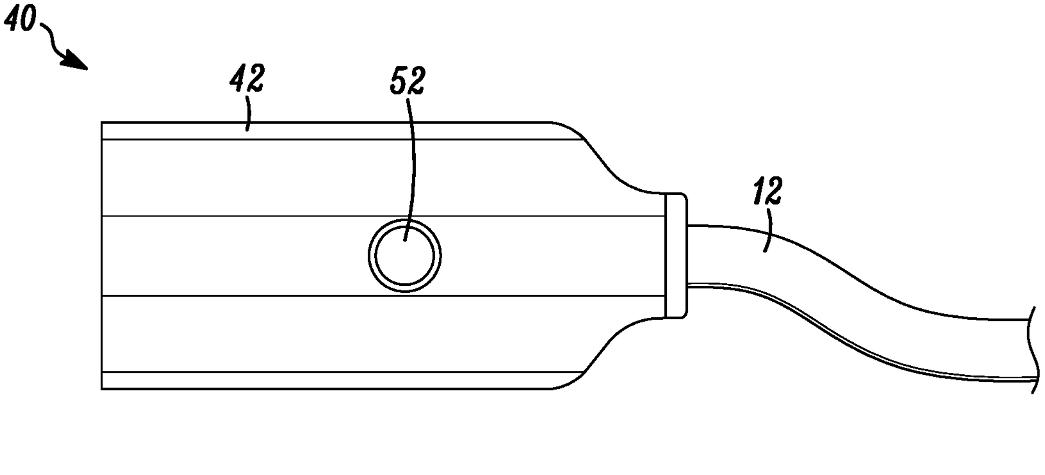
FIGS. 6A and 6B are a top view and end view, respectively, of the receptacle end of an electrical power cord.
Figure 6B:
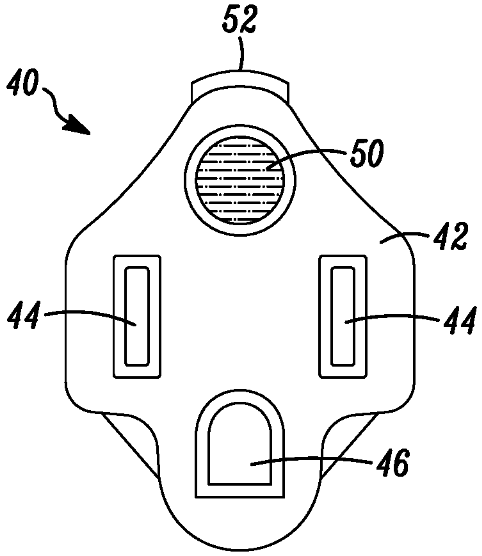
Figure 7:
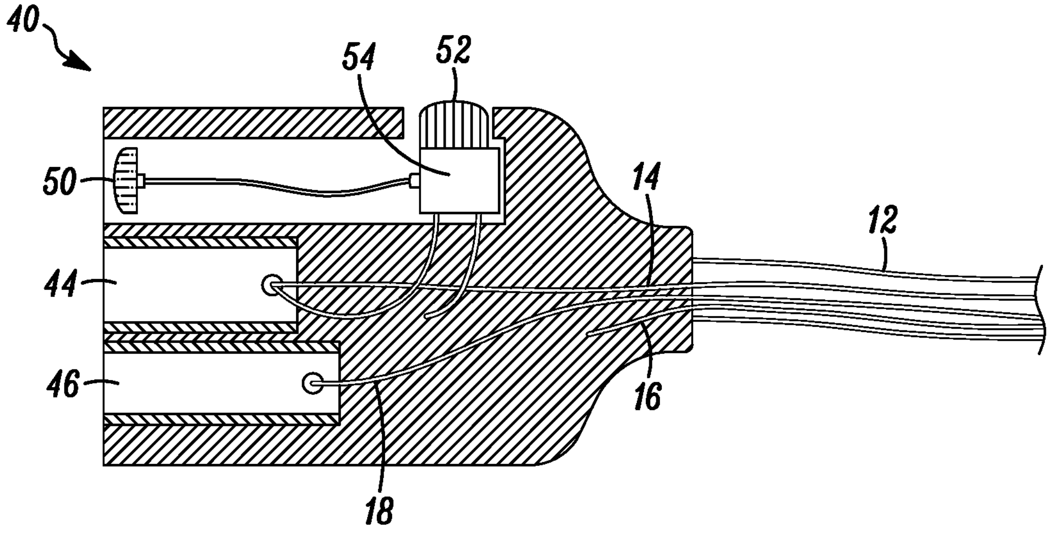
FIG. 7 is a partial cross-sectional schematic view of the receptacle end.

As generally discussed above, one embodiment of the present invention further includes a light source incorporated into the receptacle end 40 of an extension cord 10. Referring now to FIGS. 6A and 6B, the receptacle end 40 is better illustrated. Further, FIG. 7 illustrates a partial cross-sectional view, illustrating the internal components of receptacle end 40, as contemplated.

Referring now to FIGS. 6A and 6B, receptacle end 40 similarly includes a housing 42 which is designed to contain the components needed to provide electrical connections. Specifically, this will generally include a pair of power receptacles 44, and a ground receptacle 46. Contained within a front side of receptacle end 40 is a light source 50, which is operated by a push button switch 52 located on a top side of housing 42. Referring now specifically to FIG. 7, a cross-sectional schematic view is illustrated, which helps illustrate the inner workings of receptacle end 40. In this particular embodiment, bulb 50 is electrically connected to a switching mechanism 54. Switching mechanism 54 is operably connected to push button 52 to accommodate convenient user operation. As will be anticipated, ground receptacle 46 is similarly connected to an electrical cable 18. Power receptacle 44 is similarly connected to one of the required power cords 14 in order to provide necessary operation. Although not specifically illustrated in FIG. 7, a second electrical cord 16 will be operably connected to the other power receptacle 44. In receptacle end, electrical power is provided to switch 54 via internal electrical connections to the power supply lines. In this way, electrical power for light 50 is obtained only when the plug-in end 20 is connected to an electrical power source. This provides yet a further utility for the present invention, as the user is able to illuminate a work area or surroundings after electrical connections are obtained.

Figure 6C:
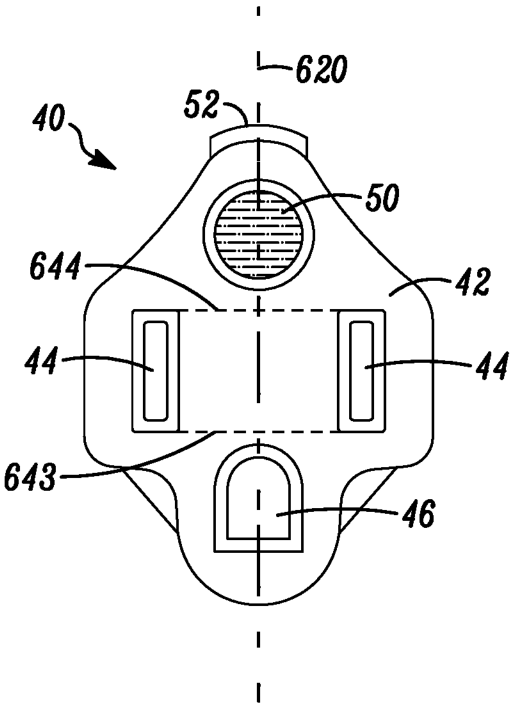
FIG. 6C is an end view of the receptacle end with reference lines shown in phantom.

FIG. 6C is an end view of the receptacle end with reference lines shown in phantom. The reference lines are shown in phantom since these lines are not really visible on the receptacle end. The reference lines are shown so that the position of the lightbulb or light source 50 can be can be set on one side of a box or rectangle 640 having reference line 644, reference line 643, and the blade power receptacles 44 defining the box or rectangle 644. As shown in FIGS. 6A, 6B, and 6C, the ground receptacle 46 is on one side of the box or rectangle 440 and the light 50 is on the other side of the box or rectangle 644. In this embodiment, the light 50 and the ground receptacle 46 are along line 620 which could also be considered a centerline along the face of the receptacle end 40. It should be noted that some receptacle end have one power receptacle 44 that is longer than the other power receptacle 44. In this case the box defined would still be a four-sided polygon with at least two unequal sides represented by the differently sized power receptacles 44. The light 50 would still be on one side of the four-sided polygon 644 and the ground receptacle 46 would be on the other side of the four-sided polygon 644.

As a further enhancement, push button 52 is configured to have an embedded light device (such as a light emitting diode, or LED), which will be illuminated whenever power is present. In this way, a user will be able to easily see and locate button 52. Further, it is contemplated that button 52 is a click-on/click-off button which will allow the light to stay on for extended periods of time. Since this is driven by line power, the issues related to battery preservation do not exits.

In addition to the embodiments outlined above, another alternative may include the use of motion sensors to activate the relevant light source. In this embodiment, various types of motion sensors could be included in either the plug end housing or the receptacle end housing, which would then be used to activate or "wake" the cord when moved. The motion sensors could include an accelerometer which will detect movement of the cord end, or could include a hall-effect sensor which would detect the presence of other objects moving adjacent the relevant housing. Once movement is detected, a light within the housing would be activated. This could include the "spot light" itself, the light on the button, or an internal light to help find the cord end. In combination with the other features involved, this motion detection feature provides addition utility for the user.

Figure 8:
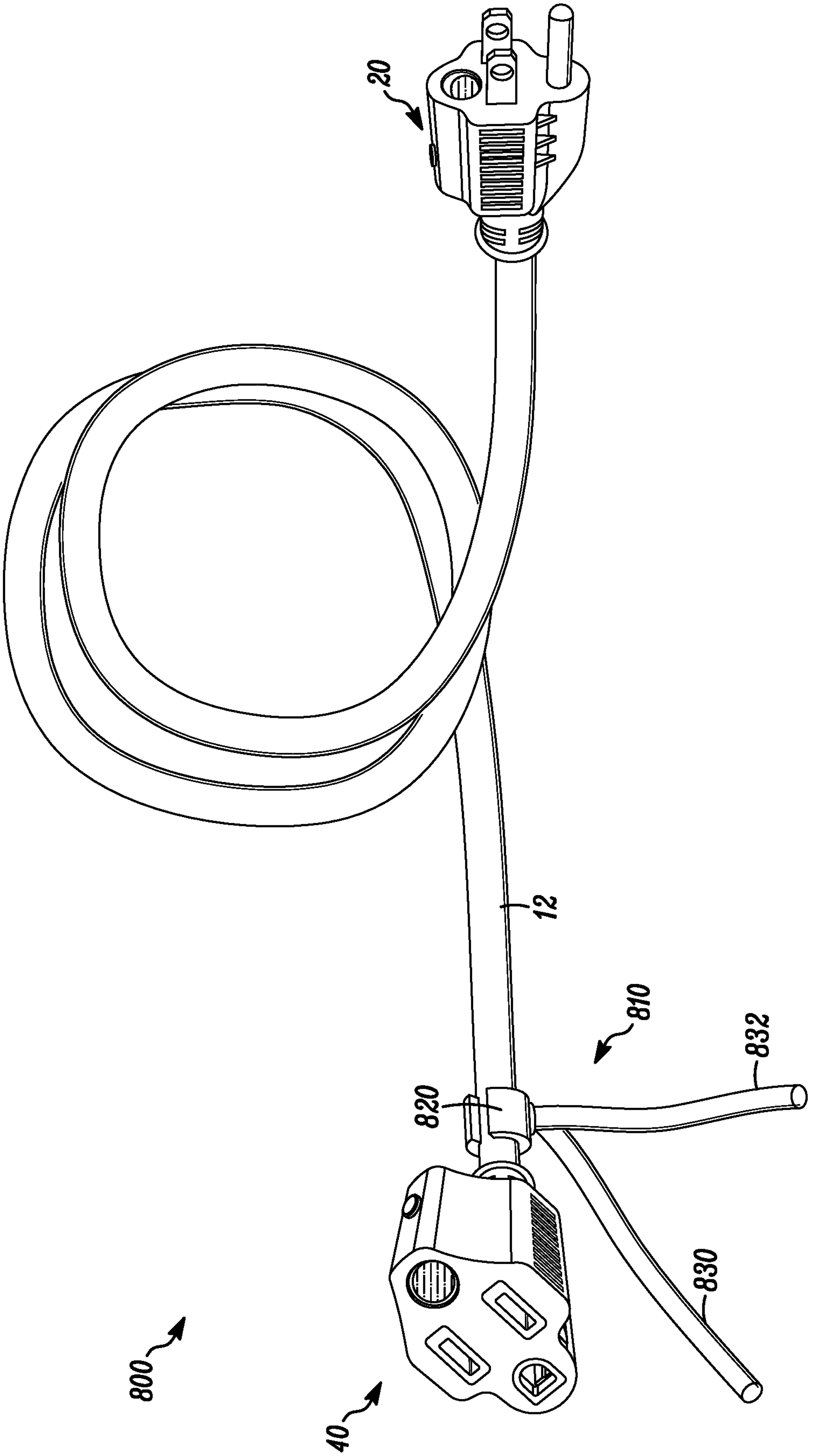
FIG. 8 is a perspective view of another embodiment of the lighting system as embodied in an extension cord.
Figure 9:
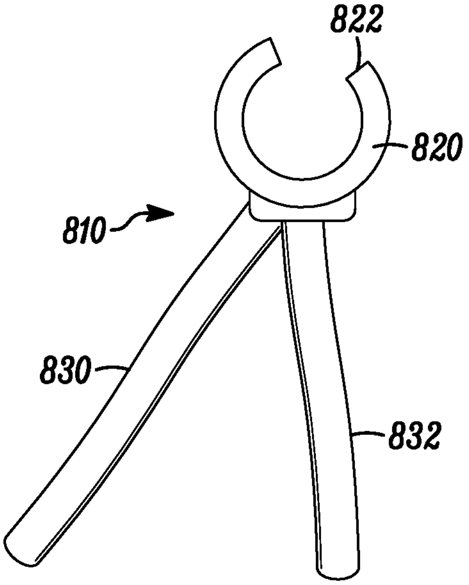
FIG. 9 is a perspective view of a pair of legs that are adjustably attachable to an extension cord.

FIG. 8 is a perspective view of another embodiment of the lighting system 800 as embodied in an extension cord. The extension cord 10 includes a plug-in end 20, a receptacle end 40 and an electrical cord 12. Plug-in end 20 and receptacle end 40 are both physically and electrically connected to one another via cord 12. Conductors are housed within the electrical cord 12 that connect the ground plug 26 and the ground receptacle 46. Similarly, conductors housed within the electrical cord 12 connect the positive blade 24 and the positive receptacle 44 and connect the negative blade 24 and the negative receptacle 44. The lighting system 800 also includes a support 810. FIG. 9 is a plan view of a pair of legs that are adjustably attachable to an extension cord to form a support 110. Now referring to both FIGS. 8 and 9, the support will be more fully detailed. The support 810 is comprised of a clasp 820 which fits over the electrical cord 12. The clasp 820 includes a slot 822. The clasp is made of a material that can be expanded slightly to place the cord 12 through the slot 822 and then returns to its original position to clasp the electrical cord 12. The clasp 820 can be moved along the length of the cord 12. The clasp 820 can also be removed and repositioned on another part of the cord 12. It can also be moved to another cord if necessary. The clasp 820 can be made of a plastic material or a metal material or any material that can operate in the elastic range when placing the clasp 820 on the cord or taking the clasp 820 off the cord 812. In other words it is adjustable as needed or desired. The adjustability of the clasp is enhanced by the fact that the clasp 820 can moved along the length of the cord as needed. Attached to the clasp 820 are a set of legs 830 and 832 which can be used support the receptacle end 40 of the electrical cord 12. The legs 810, 812 can be made of a stiff material and adjustable with respect to the clasp 820. The legs 830. 832 can be made of a bendable material such as a bendable metal which can be moved to different positions relative to the clasp 820. The legs 830, 832 can also be made of a telescoping material so that the legs 830, 832 may be adjusted to various lengths. In some embodiments, the legs can be removably attached to the clasp 820.

Figure 10:
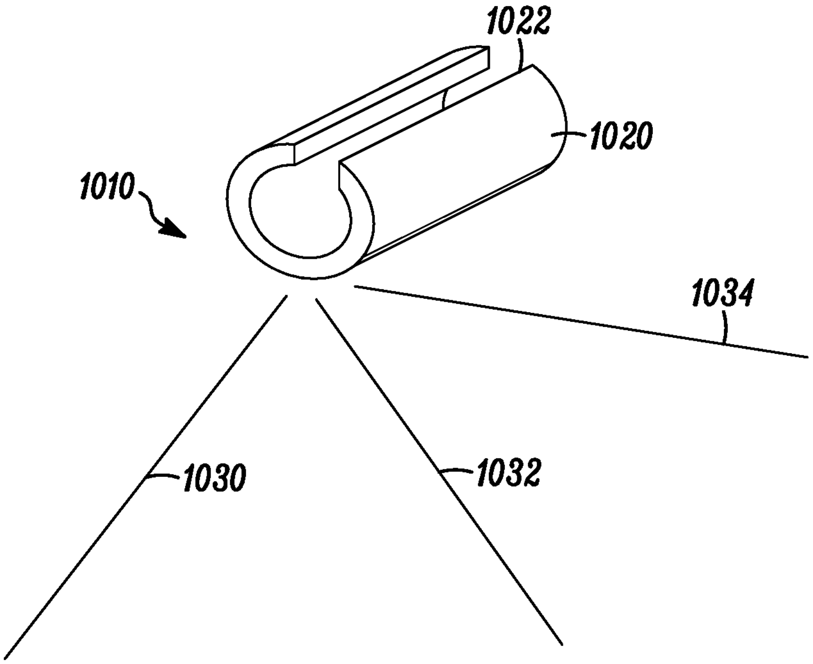
FIG. 10 is a perspective view of a support having clasp and having three legs that are adjustably attachable to the clasp to form a tripod attachable to the extension cord.

FIG. 10 is a perspective view of a support 1010 having clasp 1020 and having three legs that are adjustably attachable to the clasp to form a tripod attached to the extension cord 12. The clasp 1020 is similar to the clasp 820 described above. The clasp 1020 includes a slit 1022 to allow the clasp 1020 to spread slightly so that the electrical cord 12 can be grasped and held in position along the cord 12. The support 1010 has a first leg 1030, a second leg 1032, and a third leg 1034. The legs can be bendable, straight, or telescoping. This allows for the receptacle end 40 to be held in any number of positions.

Figure 11:
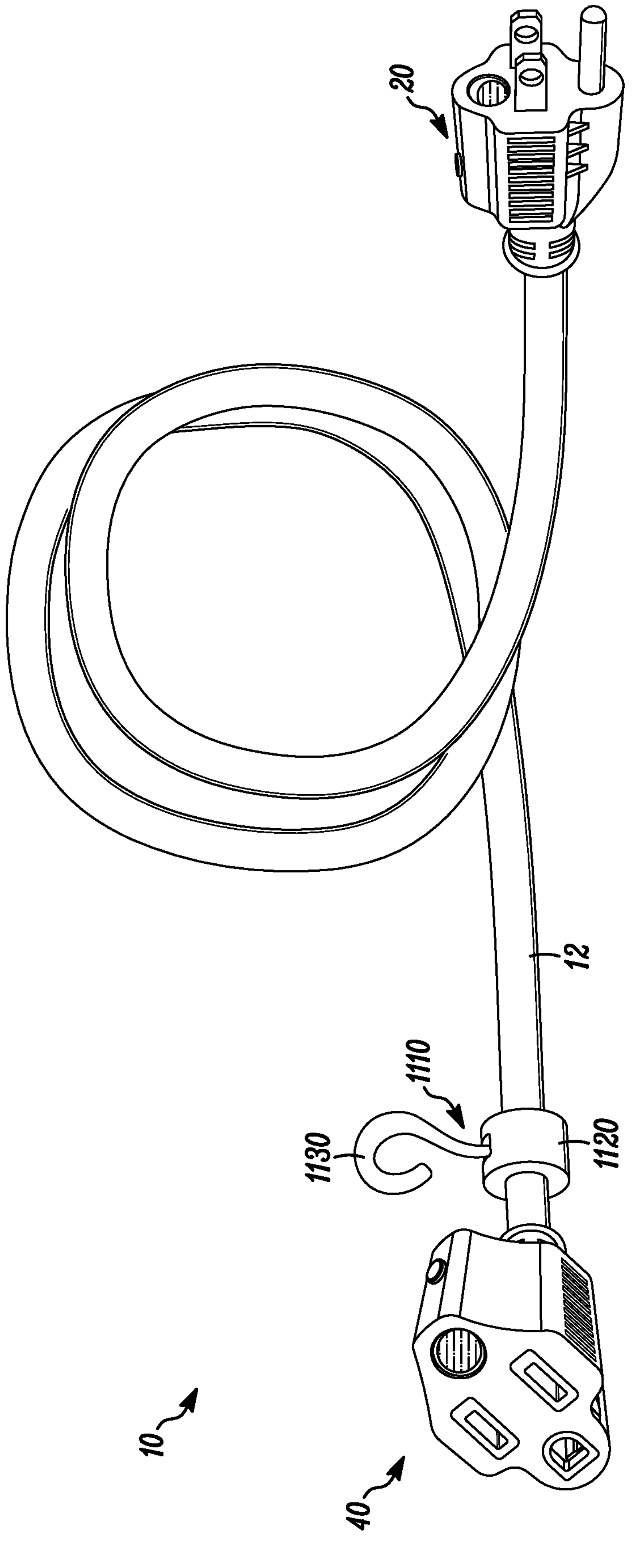
FIG. 11 is a perspective view of a hanger or hook which is adjustably attachable to an extension cord.

FIG. 11 is a perspective view of a hanger or hook which is adjustably attachable to an extension cord 12. The hanger or hook is another embodiment of a support 1110 that can be attached to the extension cord 12. As shown, the support 1110 includes a clasp 1120. The clasp 1120 is similar to the clasp 820. It includes a slot and is made of a material that operates in an elastic range. The clasp can be pulled apart slightly and it returns to its original position to clasp the extension cord 12. Attached to the clasp 1120 is a hook 1130 which can be used to attach to something near the area where light from light 50 needs to be directed. This eliminates the need to use one hand or one's teeth in holding the light 50 in position in a tight space. It is contemplated that the hook 1130 could be of different sizes. In another embodiment, the hook 1130 could be a bendable wire so that a hook of a needed size could be fashioned by the user. The hook could also be formed to different positions with respect to the electrical cord 12. For example, the hook may need to be essentially parallel to the electrical cord 12 in some situations and could be formed as needed.

The clasps 820, 1020, 1120 can be moved along the length of the electrical cord 12 to any position needed. In some instances, the clasps 820, 1020, 1120 can be moved by sliding them along the length of the electrical cord 12. In other instances, the clasps 820, 1020, 1120 can be removed and placed in a new position along the electrical cord 12. It is also contemplated that the clasps could be of different sizes and still be within the scope of the claims of this application. In fact, a clasp could be formed as a hook sized to grasp the electrical cord 12. Such a hook would be sized so as not to damage the electrical cord 12.

It is contemplated that in some embodiments, legs or hooks could be permanently attached to the electrical cord 12 or even to the plug-in end. It is further contemplated that other means of temporary attachment of the legs or the hook could be devised and would be within the scope of the claims of this application.

Figure 12:
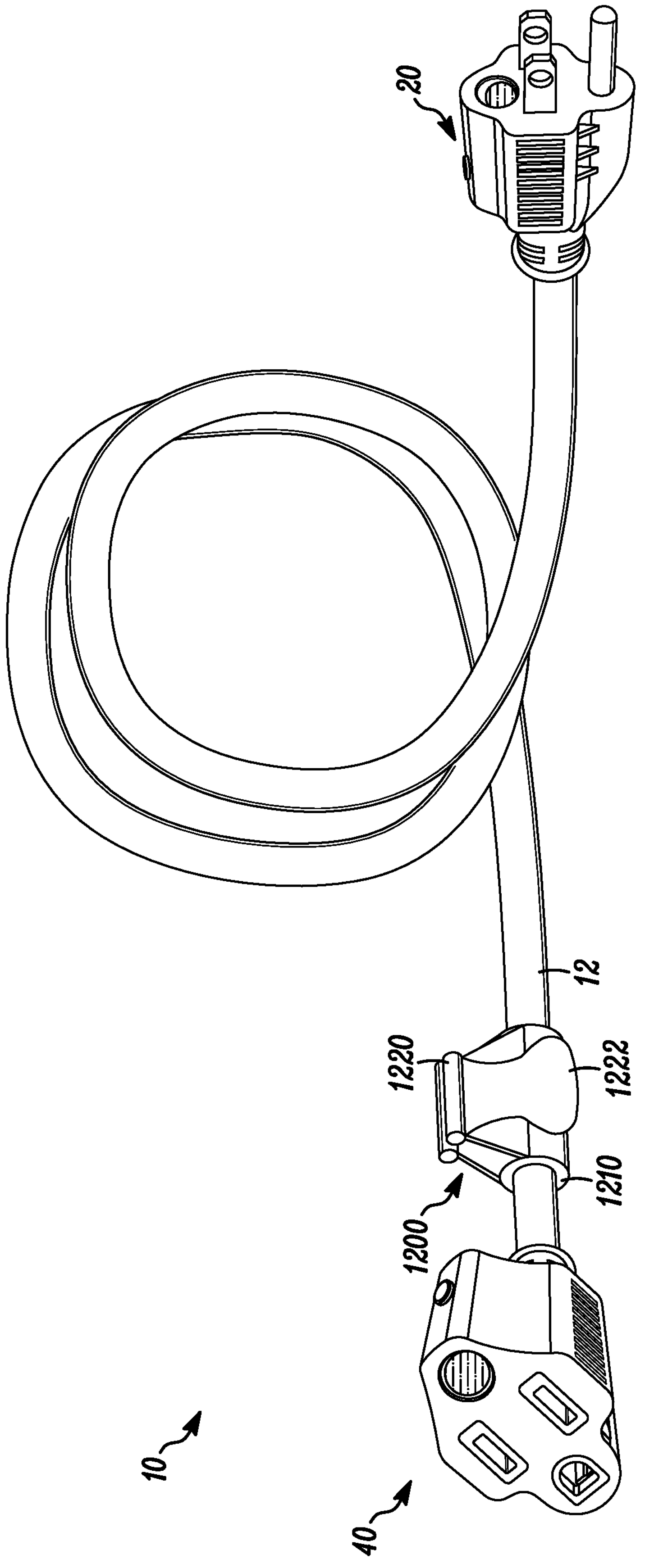
FIG. 12 is a perspective view of a clip which is adjustably attachable to an extension cord.

FIG. 12 is a perspective view of a clip 1200 which is adjustably attachable to an extension cord 12. The clip 1200 would have a base 1210 that is attached to the electrical cord 12 and a clip end 1220 that could be moved or separated and then released to clip on to an object near where light is needed. As shown, the clip end 1220 has a pair of arms 1222 (one of which is shown) which can be used to open the clip end 1220 and subsequently released to allow the clip end 1220 to attach to an object. The clip 1200 could be permanently attached or could be removably attached to the extension cord 12.

Figure 13:
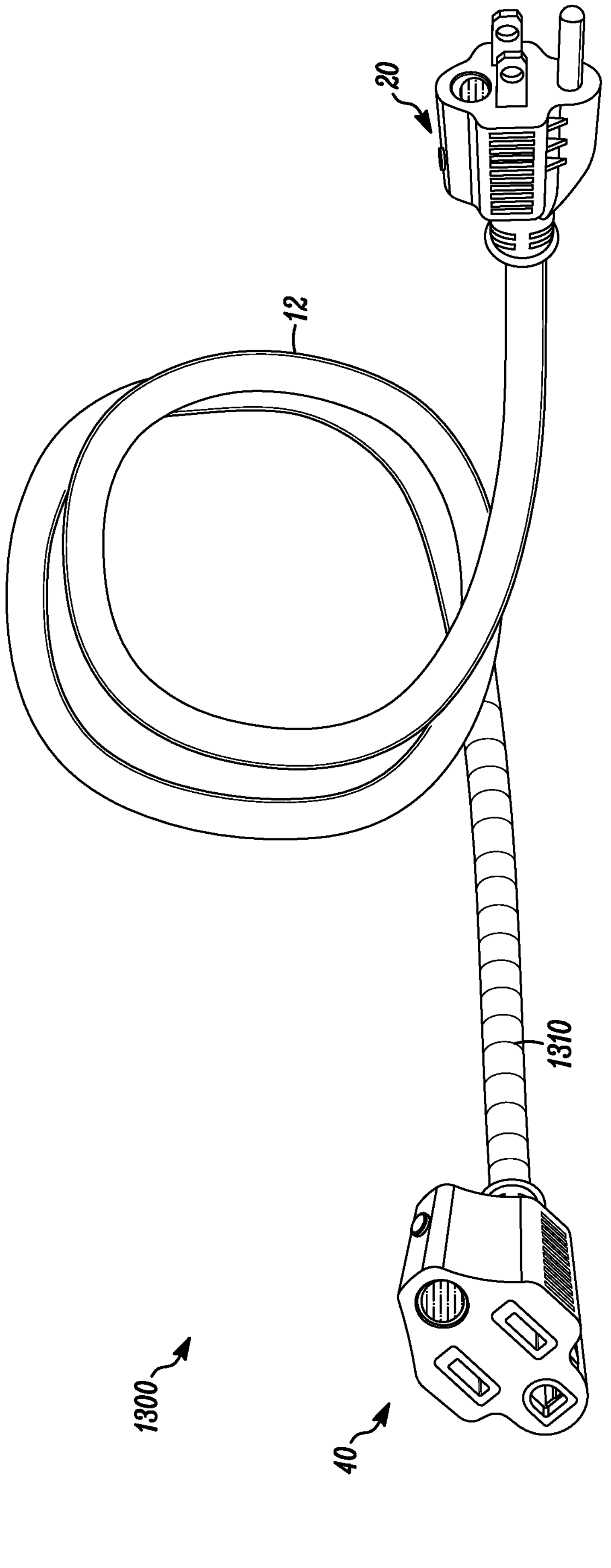
FIG. 13 is a perspective view of a lighting system having an extension cord having a flexible goose neck type end.

FIG. 13 is a perspective view of a lighting system 1300 having an extension cord 12 having a flexible goose neck type end 1310. The flexible goose neck end 1310 can be bent to a desirable position and will remain in that position until bent to another position.

Figure 14:
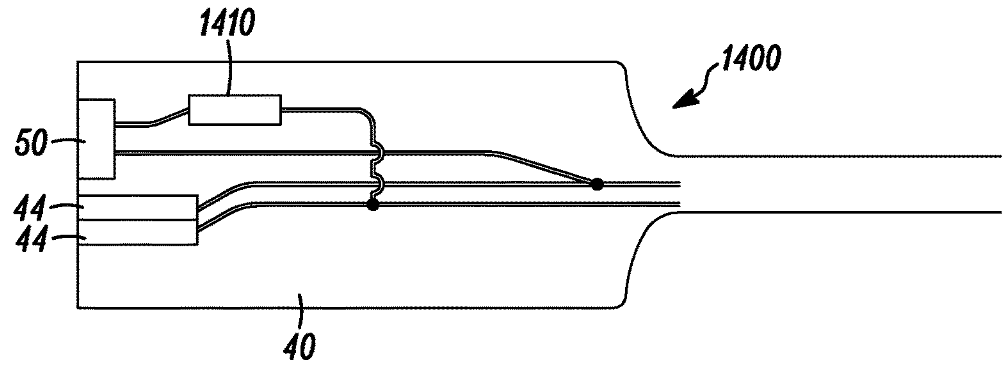
FIG. 14 is a schematic view of a lighting system that includes a motion sensor for activating a light on the one end of the electrical extension cord.

FIG. 14 is a schematic view of a lighting system 1400 that includes a motion sensor for activating a light on the one end of the electrical extension cord. The plug-in end 40 is shown for illustrative purposes. It should noted that either end could be provided with a motion detector that enables an on/off switch for the light on that particular end. The end 40 includes the light 50. The end 50 also includes a motion detector switch 1410 which is enabled in response to motion. It is envisioned that the motion detector switch 1410 will not turn on unless the end is provided with a vigorous shake and will turn off when again the end 40 is shaken vigorously. This prevents the light from turning on and off in response to minor bumps that might occur while working in a tight space.

Figure 15:
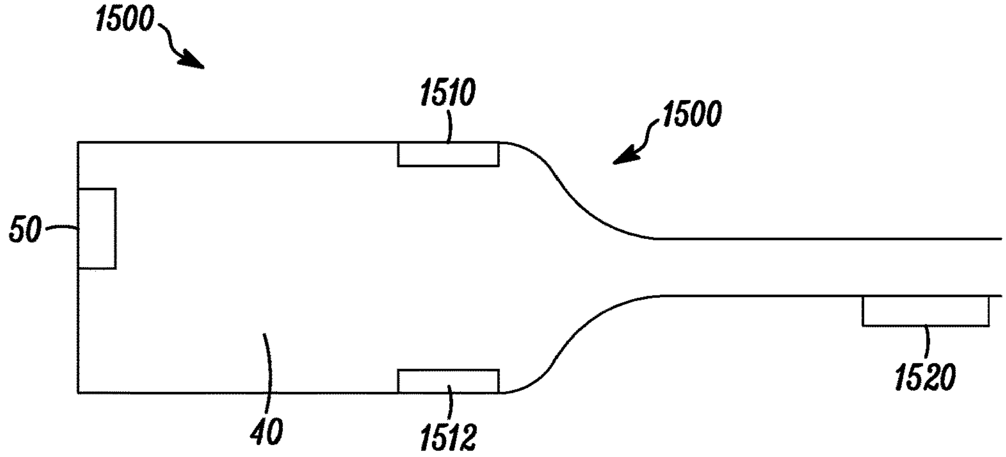
FIG. 15 is a schematic view of a lighting system that includes at least one magnet that can be used to position an end or any portion of the cord to a magnetizeable surface, such as a ferrous metal object.

FIG. 15 is a schematic view of a lighting system 1500 that includes at least one magnet that can be used to position an end or any portion of the cord to a magnetizeable surface, such as a ferrous metal object. As shown, the plug-in end 40 could be molded with a magnet 1510 and a magnet 1512 therein. In another embodiment, a magnet 1520 is associated with the electrical cord 12. The magnet 1520 could be permanently affixed to the electrical cord 12 or could be moveable with respect the electrical cord 12. A magnet could also be made part of the cord or the clasp or the hook discussed above. In some embodiments, a magnet could be incorporated into any of the above elements or even all of the above elements. In still other embodiments, the magnet could be an electromagnet that would be enabled in the presence of electrical current. In some instances such an electromagnet could be enabled by a switch which would control the current flow in a corresponding coil. This would be useful in preventing the extension cord from becoming magnetically coupled when not desired.

Figure 16:
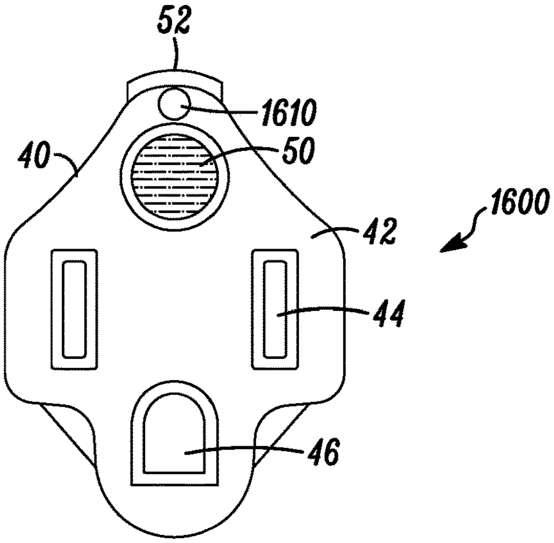
FIG. 16 is a front view of a lighting system that includes a camera in the receptacle end of an electrical cord, such as an extension cord.

FIG. 16 is a front view of a lighting system 1600 that includes a camera in the receptacle end 40 of an electrical cord 12, such as an extension cord. The camera can be enabled to view a tight space into which the receptacle end might be placed. Memory can also be associated with the camera so that the image or images can be stored in memory before viewing. In another embodiment, the camera can include a transmitter for transmitting the images to an external device communicatively coupled to the camera.

In summary, an extension cord has lighting incorporated therein to allow a user to illuminate a desired area where the cord is to be used. The extension cord includes an electrical cord having conductor wires configured to carry electrical current, a first housing and a second housing. The first housing is permanently affixed to a first end of the electrical cord. The first housing supports a set of electrical prongs extending from a first substantially flat, outward end surface of the first housing, and is configured to be coupled to an electrical receptacle. The electrical prongs are electrically coupled to the conductor wires within the electrical cord and include a positive prong, a negative prong and a ground prong. The positive prong and the negative prong are arranged parallel to one another. The ground prong is situated equidistant from and below the positive prong and negative prong, The first housing further supports a first light system positioned above the electrical prongs including a first light source, a battery power source and a switch positioned on an upper side of the first housing for selectively powering the first light source. The first light source is positioned near the first substantially flat, outward end surface of the first housing, and near an opening in the first substantially flat, outward end surface. The first light source is aligned to produce a beam of light directed outwardly through a first opening in the first outward end surface of the first housing in a first direction substantially parallel with and in line with a direction of the extending prongs. The light illuminates a desired area projecting out from the first, substantially flat outward end surface of the first housing. The opening in the first outward end surface of the first housing is above the positive prong and the negative prong. The first opening substantially surrounded by the material forming the first housing.

The extension cord also has a second housing permanently affixed to a second end of the electrical cord. The second housing supports a receptacle structure configured to receive electrical prongs comprising a positive receptacle, a negative receptacle and a ground receptacle. The positive receptacle and the negative receptacle are arranged parallel to one another and have receptacle openings in a second substantially flat, outward end surface of the second housing. Also included is the ground receptacle situated equidistant from and below the positive receptacle and negative receptacle. The receptacle structure is electrically coupled to the connector wires such that an electrical connection exists between the receptacle structure and the electrical prongs of the first housing. The second housing further includes a second lighting system substantially within the second housing and positioned above the receptacle structure having a second light source, a second switch situated on an upper side of the second housing, and a power connection. The power connection supplies power from the electrical cord to the second switch so power from the cord can be selectively supplied to the second light source of the second lighting system. The second light source of the second lighting system is positioned near the second substantially flat, outward end surface of the second housing. The second light source is positioned near a second opening in the second substantially flat, outward end surface and aligned to produce beam of light directed outwardly through the second opening in the second substantially flat outward end surface of the second housing in a direction substantially in line with a direction of the receptacle structure. The second opening in the second substantially flat outward end surface of the second housing is substantially surrounded by the material forming the second housing. The second opening is above the positive receptacle and the negative receptacle.

The ground prong is on one side of an imaginary line between the positive prong and the negative prong and the first opening in the first substantially flat outward end surface of the first housing is on the opposite side of the imaginary line between the positive prong or the negative prong. The first housing closely surrounds the first prong, the second prong, the ground prong and the opening in the first substantially flat outward end of the first housing.

The ground receptacle is on one side of an imaginary line between the positive receptacle and the negative receptacle. The second opening in the second substantially flat outward end surface of the second housing is on the other side of the imaginary line between the positive receptacle or the negative receptacle. The second housing closely surrounds the first receptacle, the second receptacle, the ground receptacle and the second opening in the second substantially flat outward end surface of the second housing. Also included in the extension cord is a support for supporting a portion of the electrical cord near the second housing.

In some embodiments of the extension cord, a second battery system is located in the second housing so the second lighting system can be operated using power from the second battery or power from the cord. In some embodiments of the extension cord, battery is rechargeable. In some embodiments of extension cord the second lighting system is powered by electrical current carried by the cord and the second housing further comprises an internal lighting system configured to internally illuminate the second housing when the first housing is connected to an electrical power source. The first housing, in some embodiments, includes a first lens which is positioned in front of the first light source in the first substantially flat, outward end surface of the first housing to provide a controlled beam of light to be emitted from the first housing when the light source is illuminated, In still other embodiments, the second housing includes a second lens which is positioned in front of the second light source in the second substantially flat, outward end surface of the second housing to provide a controlled beam of light when second light source is illuminated.

An upper portion of the first housing has a ridge structure extending upwardly from a shoulder region on both sides of the ridge structure, The upper portion of the ridge structure narrows at a top portion thereof, The light system is contained within the ridge structure and the switch is positioned on an upper portion of the ridge structure. The second housing also has a ridge structure extending upwardly from a shoulder region of both sides of the ridge structure, with an upper portion of the ridge structure which narrows at a top portion thereof. The second lighting system is contained within the ridge structure and the switch controlling the second lighting system is positioned on the top of the ridge structure.

In some embodiments, of the extension cord the support further includes a clasp removably attached to a portion of the electrical cord. The clasp, in one embodiment, is removably attached to a portion of the electrical cord. Various accoutrements can be attached to the clasp. In one embodiment, at least one leg attached to the clasp. The at least one leg can be bendable, or can be extendable with a telescoping portion. In some embodiments, two legs are attached to the clasp. In other embodiments, three legs are attached to the clasp. In still further embodiments, at least one hook attached to the clasp. In still other embodiments, at least one clip attached to the clasp.

In still further embodiments, the support further includes a magnet for magnetically attaching the support to a ferrous material to hold it in a desired position. A magnet, in one embodiment, is within the second housing for magnetically attaching the second housing to a ferrous material to hold it in a desired position.

In another embodiment, an extension cord with lighting capabilities provides directed light sources from each end of the extension cord, and includes an electrical cord having a plurality of electrical connectors which terminate at a first end and a second end. The plurality of electrical connectors are surrounded by insulating material. The extension cord includes a first housing coupled to the first end of the electrical cord, and a second housing coupled to the second end of the electrical cord. The first housing supports a set of electrical prongs including a positive electrical prong, a negative electrical prong and a ground prong. Each of the electrical prongs extend from a substantially flat first end surface of the first housing and are coupled to one of the electrical connectors within the electrical cord. The first housing further includes a pair of side surfaces positioned adjacent the positive electrical prong and the negative electrical prong. The pair of side surfaces are substantially orthogonal to the substantially flat first end surface. The first housing also has an upper surface extending adjacent to and between the two side surfaces. The upper surface has a pair of shoulder sections adjacent the side surfaces, and a ridge structure extending therebetween which extends above the pair of shoulder sections. A first lighting system is contained within the first housing and includes a battery power source, a first light source and a first switch. The first light source is mounted within a first opening in the first substantially flat end surface of the first housing at a position near the first substantially flat end surface and above the positive electrical prong and the negative electrical prong and opposite the ground prong such that it is contained within the ridge structure. Light from the first light source is directed away from the substantially flat first end surface in a direction substantially parallel with direction in which the set of electrical prongs extend. the first substantially flat end surface lighting system is selectively operable by a user operating the switch of the first lighting system which is positioned on an outer surface of the first housing.

The electrical extension cord also includes a second housing coupled to the second end of the electrical cord. The second housing supports a set of electrical receptacles comprising a positive electrical receptacle, a negative electrical receptacle and a ground receptacle. Each of the electrical receptacle is positioned within a substantially flat second end surface of the second housing and coupled to one of the electrical connectors within the electrical cord. The second housing also has a pair of side surfaces positioned adjacent the positive electrical receptacle and the negative electrical receptacle, with the pair of side surfaces being substantially parallel with one another. The second housing also includes an upper surface extending adjacent to and between the two side surfaces. The upper surface has a pair of shoulder sections adjacent the side surfaces and a ridge structure extending therebetween which extends above the pair of shoulder sections in a direction away from the set of electrical receptacles.

A second lighting system is contained within the second housing and includes a second power source, a second light source and a second switch. The second light source is mounted within a second opening in the second substantially flat end surface of the second housing at a position above the positive electrical receptacle and the negative electrical receptacle, and opposite the ground receptacle such that it is contained within the ridge structure. Light from the second light source is directed away from the second substantially flat end surface of the second housing in a direction substantially perpendicular to the second end surface of the second housing. The second lighting system is selectively operable by a user operating the second switch of the second lighting system which is positioned on an outer surface of the second housing. The first housing and the second housing are integrally connected to the electrical cord so that all components of the housing and insulating material are coupled to one another.

In one embodiment, the second power source comprises electrical connections to the electrical connectors within the cord so that power is provided to the second lighting system via the connectors hen the first prongs are connected to electrical power. In one embodiment, the electrical cord near the second housing is formed as a gooseneck which is bendable to a number of positions. In still a further embodiment the second housing further comprises a camera in the flat face of the second housing.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. An extension cord having lighting incorporated therein allowing a user to illuminate a desired area where the cord is to be used, the extension cord comprising:

an electrical cord having conductor wires configured to carry electrical current;

a first housing permanently affixed to a first end of the electrical cord, the first housing supporting a set of electrical prongs extending from a first substantially flat, outward end surface of the first housing and configured to be coupled to an electrical receptacle, wherein the electrical prongs are electrically coupled to the conductor wires within the electrical cord and comprise a positive prong, a negative prong and a ground prong, with the positive prong and the negative prong arranged parallel to one another, and the ground prong being situated equidistant from and below the positive prong and negative prong, the first housing further supporting a first light system positioned above the electrical prongs comprising a first light source, a battery power source and a switch positioned on an upper side of the first housing for selectively powering the first light source, wherein the first light source is positioned near the first substantially flat, outward end surface of the first housing, and near an opening in the first substantially flat, outward end surface, the first light source aligned to produce a beam of light directed outwardly through a first opening in the first outward end surface of the first housing in a first direction substantially parallel with and in line with a direction of the extending prongs, and illuminating a desired area projecting out from the first, substantially flat outward end surface of the first housing, the opening in the first outward end surface of the first housing above the positive prong and the negative prong, the first opening substantially surrounded by the first housing; and a second housing permanently affixed to a second end of the electrical cord, the second housing supporting a receptacle structure configured to receive electrical prongs comprising a positive receptacle, a negative receptacle and a ground receptacle, with the positive receptacle and the negative receptacle arranged parallel to one another and having receptacle openings in a second substantially flat, outward end surface of the second housing, and the ground receptacle situated equidistant from and below the positive receptacle and negative receptacle, the receptacle structure electrically coupled to the conductor wires such that an electrical connection exists between the receptacle structure and the electrical prongs, the second housing further including a second lighting system substantially within the second housing and positioned above the receptacle structure having a second light source, a second switch situated on an upper side of the second housing, and a power connection, the power connection supplying power from the electrical cord to the second switch so power from the cord can be selectively supplied to the second light source of the second lighting system, the second light source of the second lighting system positioned near the second substantially flat, outward end surface of the second housing, the second light source positioned near a second opening in the second substantially flat, outward end surface and aligned to produce beam of light directed outwardly through the second opening in the second substantially flat outward end surface of the second housing in a direction substantially in line with a direction of the receptacle structure, the second opening in the second substantially flat outward end surface of the second housing substantially surrounded by the second housing, the second opening and above the positive receptacle and the negative receptacle;

the ground prong is on one side of an imaginary line between the positive prong and the negative prong and the first opening in the first substantially flat outward end surface of the first housing is on an opposite side of the imaginary line between the positive prong or the negative prong, and the first housing closely surrounding the first prong, the second prong, the ground prong and the opening in the first substantially flat outward end of the first housing;

the ground receptacle is on one side of an imaginary line between the positive receptacle and the negative receptacle the second opening in the second substantially flat outward end surface of the second housing being on another side of the imaginary line between the positive receptacle or the negative receptacle, and the second housing closely surrounding the first receptacle, the second receptacle, the ground receptacle and the second opening in the second substantially flat outward end surface of the second housing; and a support affixed to the electrical cord proximate the second housing for supporting a portion of the electrical cord and the second housing.

2. The extension cord of claim 1 wherein the second housing also supports a second battery system so the second lighting system can be operated using power from the second battery or power from the cord.

3. The extension cord of claim 1 wherein the battery is rechargeable.

4. The extension cord of claim 1 wherein the second lighting system is powered by electrical current carried by the cord and the second housing further comprises an internal lighting system configured to internally illuminate the second housing when the first housing is connected to an electrical power source.

5. The extension cord of claim 4 wherein the first housing includes a first lens which is positioned in front of the first light source in the first substantially flat, outward end surface of the first housing to provide a controlled beam of light to be emitted from the first housing when the light source is illuminated, and wherein the second housing includes a second lens which is positioned in front of the second light source in the second substantially flat, outward end surface of the second housing to provide a controlled beam of light when second light source is illuminated.

6. The extension cord of claim 1 wherein an upper portion of the first housing has a ridge structure extending upwardly from a shoulder region on both sides of the ridge structure, with an upper portion of the ridge structure which narrows at a top portion thereof, with the light system contained within the ridge structure and the switch is positioned on an upper portion of the ridge structure, and wherein an upper portion of the second housing has a ridge structure extending upwardly from a shoulder region of both sides of the ridge structure, with an upper portion of the ridge structure which narrows at a top portion thereof, with the second lighting system contained within the ridge structure and the switch controlling the second lighting system is positioned on the top of the ridge structure.

7. The extension cord of claim 1 wherein the support further includes a clasp removably affixed to the portion of the electrical cord proximate the second housing.

8. The extension cord of claim 1 wherein the support further includes:

a clasp removably attached to a portion of the electrical cord; and at least one hook attached to the clasp.

9. The extension cord of claim 1 wherein the support further includes:

a clasp removably attached to a portion of the electrical cord; and at least one clip attached to the clasp.

10. The extension cord of claim 1 wherein the support further includes a magnet for magnetically attaching the support to a ferrous material to hold it in a desired position.

11. The extension cord of claim 1 wherein the support further includes a magnet within the second housing for magnetically attaching the second housing to a ferrous material to hold it in a desired position.

12. An extension cord having lighting incorporated therein allowing a use to illuminate a desired cord is to be used, the extension cord comprising:

an electrical cord having conductor wires configured to carry electrical current;

a first housing permanently affixed to a first end of the electrical cord, the first housing supporting a set of electrical prongs extending from a first substantially flat, outward end surface of the first housing configured to be coupled to an electrical receptacle, wherein the electrical prongs are electrically coupled to the conductor wires within the electrical cord and comprise a positive prong, a negative prong and a ground prong, with the positive prong and the negative arranged parallel to one another, and the ground prong being situated equidistant from and below the positive prong and negative prong, the first housing further supporting a first light system positioned above the electric prongs comprising a first light source, a battery power source and a switch positioned on an upper side of the first housing for selectively powering the first light source, wherein the first light source is positioned near the first substantially flat, outward end surface of the first housing, and near an opening in the first substantially flat, outward end surface, the first light source aligned to produce a beam of light directed outwardly through a first opening in the first outward end surface of the first housing in a first direction substantially parallel with and in line with a direction of the extending prongs, and illuminating a desire area projecting out from the first, substantially flat outward end surface of the first housing, the opening in the first outward end surface of the first housing above the positive prong and the negative prong, the first opening substantially surrounded by the first housing; and a second housing permanently affixed to a second end of the electrical cord, the second housing supporting a receptacle structure configured to receive electrical prongs comprising a positive receptacle, a negative receptacle and a ground receptacle, with the positive receptacle and the negative receptacle arranged parallel to one another and having receptacle openings in a second substantially flat, outward end surface of the second housing, and the ground receptacle situated equidistant from and below the positive receptacle and negative receptacle, the receptacle structure electrically coupled to the conductor wires such that an electrical connection exists between the receptacle structure and the electrical prongs, the second housing further including a second lighting system substantially within the second housing and positioned above the receptacle structure having a second light source, a second switch situated on an upper side of the second housing, and a power connection, the power connection supplying power from the electrical cord to the second switch so power from the cord can be selectively supplied to the second light source of the second lighting system, the second light source of the second lighting system positioned near the second substantially flat, outward end surface of the second housing, the second light source positioned near a second opening in the second substantially flat, outward end surface and aligned to produce beam of light directed outwardly through the second opening in the second substantially flat outward end surface of the second housing in a direction substantially in line with a direction of the receptacle structure, the second opening in the second substantially flat outward end surface of the second housing substantially surrounded by the second housing, the second opening and above the positive receptacle and the negative receptacle;

the ground prong is on one side of an imaginary line between the positive prong and the negative prong and the first opening in the first substantially flat outward end surface of the first housing is on an opposite side of the imaginary line between the positive prong or the negative prong, and the first housing closely surrounding the first prong, the second prong, the ground prong and the opening in the first substantially flat outward end of the first housing;

the ground receptacle is on one side of an imaginary line between the positive receptacle and the negative receptacle the second opening in the second substantially flat outward end surface of the second housing being on another side of the imaginary line between the positive receptacle or the negative receptacle, and the second housing closely surrounding the first receptacle, the second receptacle, the ground receptacle and the second opening in the second substantially flat outward end surface of the second housing; and a support for sporting a portion of the electrical cord near the second housing, wherein the support comprises:

a clasp removably attached to a portion of the electrical cord; and at least one leg attached to the clasp.

13. The extension cord of claim 12 wherein the at least one leg is bendable.

14. The extension cord of claim 12 wherein the at least one leg includes a telescoping portion.

15. An extension cord with lighting capabilities to provide directed light sources from each end of the extension cord, comprising:

an electrical cord having a plurality of electrical connectors which terminate at a first end and a second end, wherein the plurality of electrical connectors are surrounded by insulating material;

a first housing coupled to the first end of the electrical cord, the first housing supporting a set of electrical prongs comprising a positive electrical prong, a negative electrical prong and a ground prong, wherein each of the electrical prongs extend from a substantially flat first end surface of the first housing and are coupled to one of the electrical connectors within the electrical cord, the first housing further having a pair of side surfaces positioned adjacent the positive electrical prong and the negative electrical prong, with the pair of side surfaces being substantially orthogonal to the substantially flat first end surface, the first housing further having an upper surface extending adjacent to and between the two side surfaces, the upper surface having a pair of shoulder sections adjacent the side surfaces;

a first lighting system contained within the first housing comprising a battery power source, a first light source and a first switch, wherein the first light source is mounted within a first opening in the first substantially flat end surface of the first housing at a position near the first substantially flat end surface and above the positive electrical prong and the negative electrical prong and opposite the ground prong such that it is contained within a ridge structure positioned upon an upper surface of the first housing, and such that light from the first light source is directed away from the substantially flat first end surface in a direction substantially parallel with direction in which the set of electrical prongs extend, the first substantially flat end surface lighting system selectively operable by a user operating the switch of the first lighting system which is positioned on an outer surface of the first housing;

a second housing coupled to the second end of the electrical cord, the second housing supporting a set of electrical receptacles comprising a positive electrical receptacle, a negative electrical receptacle and a ground receptacle, each of the electrical receptacles positioned within a substantially flat second end surface of the second housing and coupled to one of the electrical connectors within the electrical cord, the second housing further having a pair of side surfaces positioned adjacent the positive electrical receptacle and the negative electrical receptacle, with the pair of side surfaces being substantially parallel with one another, the second housing further having an upper surface extending adjacent to and between the two side surfaces, the upper surface having a pair of shoulder sections adjacent the side surfaces and a ridge structure extending therebetween which extends above the pair of shoulder sections in a direction away from the set of electrical receptacles;

a support affixed to the electrical cord proximate the second housing for supporting a portion of the electrical cord and the second housing; and a second lighting system contained within the second housing comprising a second power source, a second light source and a second switch, wherein the second light source is mounted within a second opening in the second substantially flat end surface of the second housing at a position above the positive electrical receptacle and the negative electrical receptacle, and opposite the ground receptacle such that it is contained within the ridge structure and such that light from the second light source is directed away from the second substantially flat end surface of the second housing in a direction substantially perpendicular to the second end surface of the second housing, the second lighting system selectively operable by a user operating the second switch of the second lighting system which is positioned on an outer surface of the second housing;

the first housing and the second housing are integrally connected to the electrical cord so that all components of the housing and insulating material are coupled to one another.

16. The extension cord of claim 15 wherein the second power source comprises electrical connections to the electrical connectors within the cord so that power is provided to the second lighting system via the connectors when the first prongs are connected to electrical power.

17. The extension cord of claim 15 wherein the electrical cord near the second housing is formed as a gooseneck which is bendable to a number of positions.

18. The extension cord of claim 15 wherein the second housing further comprises a camera in the second end surface of the second housing.

* * * * *